Patented Dec. 23, 1930

1,786,095

UNITED STATES PATENT OFFICE

KATSUMI TAKAHASHI, OF AZA, SHIBUYA-MACHI, TOYOTAMA-GORI, JAPAN, ASSIGNOR TO ZAIDAN HOJIN RIKAGAKU KENKYUJO, OF TOKYO, JAPAN

PROCESS OF EXTRACTING VITAMIN A FROM FISH OILS AND THE LIKE

No Drawing. Application filed May 2, 1923, Serial No. 636,261, and in Japan February 10, 1923.

This invention relates to processes of extracting vitamin A from naturally occurring fats and oils containing the same and it comprises a process in which a fat or oil, such as cod liver oil is treated with a saponifying agent to convert the fatty acids of the oil into insoluble soaps and the soaps thereafter extracted with an organic solvent such as alcohol and the vitamin recovered from the extraction medium; it further comprises processes in which the fat is saponified in the presence of an organic solvent, and it further comprises processes in which the fat is first saponified with alkali metal saponifying agents and the soaps thus formed thereafter converted into insoluble alkaline earth metal soaps and extracted with a solvent for the vitamin A.

It has long been recognized that cod liver oil, shark oil, sunfish oil, whale oil, oils from the salmon, herring, sardine and eel, butter and other milk fats, and numerous other naturally occurring fats and oils contain vitamin A, the importance of which in the normal diet has been known for several years. Diets deficient in vitamin A lead into undesirable conditions in the body. In the absence of vitamin A as a dietary constituent, body growth is inhibited and a diseased condition of the eyes often results.

My invention is directed to processes of extracting vitamin A in an approximate state of purity in order that such material may be administered in regulated quantities. More especially it is of importance to extract the vitamin A from the fats and oils in which it naturally occurs so as to make it possible to administer this highly important dietary substance uncontaminated by other substances. Furthermore, isolation of the vitamin A permits one to incorporate it in a diet without also including the fats or oils with which it is naturally associated. Many persons, more especially children, find it difficult to tolerate cod liver oil, the usual source of vitamin A, because administration of vitamin A in the form of cod liver oil is unpleasant to the palate.

I have found that vitamin A is soluble in numerous organic solvents among which may be mentioned alcohol, ether, and benzol.

But I have also found that it is not practical to attempt the extraction of vitamin A from cod liver oil for instance, by merely treating the oil with one of the organic solvents mentioned. This, I believe, is due to the fact that the fatty constituents, the glycerides, of the cod liver oil, are insoluble in the organic solvent, for instance alcoholic and the vitamin A appears to be preferentially retained in the glycerides and is not extracted by the alcohol.

Therefore, I have found it necessary to destroy the solvent power of the glycerides (that is, the fatty constituents) in the cod liver oil, before I can extract the vitamin A. I find that I can destroy the solvent power of the glycerides in the fat or oil by subjecting the fat or oil to a saponifying process thus decomposing the glycerides with the formation of soaps in which the vitamin A does not dissolve. I then subject the soaps, or saponification product, to the action of an organic solvent, alcohol for instance, with the result that the vitamin A is dissolved in the alcohol.

In the case of alcohol soluble fats containing vitamin A, the vitamin can be extracted by subjecting the fat to the action of alcohol but in this case, much of the fat is also dissolved in the alcohol and the process is troublesome. Obviously, the dissolved fat must be removed from the alcoholic extract and this is impractical or at least disadvantageous.

Therefore, I find it advantageous to first saponify the fatty substances with alkali metal hydroxides, advantageously in the presence of the organic solvent in which I wish to have the vitamin dissolved.

In the following examples, I shall describe various methods of practicing my process with especial reference to the extraction of cod liver oil, it being understood however, that other vitamin A containing fats or oils may be used as a source of raw material.

*Example 1.*—100 parts of the raw material are treated with 200 parts of 20% alcoholic potash (or soda) solution and 200 parts of ether (or petroleum ether) and kept for 24 hours at the ordinary temperature and then treated with 200 parts of 25% alcoholic calcium chloride solution. The mixture is well stirred and the precipitated calcium soap and other mineral salts are removed by filtration.

*Example 2.*—100 parts of the raw material are treated with 200 parts of 20% alcoholic potash (or soda) solution, heated for 30 minutes at the temperature below 90° C., treated with 200 parts of 30% barium chloride solution and treated as in Example 1. In the above saponification, caustic potash is more convenient than soda.

In the foregoing examples, it is to be noted that I convert the alkali metal soaps into alkaline earth metal soaps. This is the most advantageous way of separating the alcoholic or ethereal solution of vitamin A from the alkali metal soap with which it is initially associated. I do not find it practical to attempt to work up the product of the alkali metal saponification as such in association with the solvent and vitamin. It is impractical to evaporate down the alcoholic solution of alkali metal soap and vitamin. Therefore, the most convenient way is to retain the vitamin in the original alcoholic solution and convert the alkali metal soap into a soap insoluble in the alcohol. The alkaline earth metal soaps are insoluble in alcohol, ether, benzol, etc., and can be readily removed.

The filtrate resulting from the processes of Examples 1 and 2 is alcoholic or ethereal and contains, besides the vitamin A, certain impurities which must be removed. I find it advantageous to treat the filtrate for the removal of these impurities in the following manner.

Any calcium or barium chloride is removed by treating the filtrate with carbon dioxide gas and the precipitated carbonates filtered off. I then evaporate the filtrate at a low temperature under reduced pressure and treat the residue with ether, benzol or chloroform, to re-dissolve the vitamin in this fashion separating glycerine and mineral salts. Any calcium soaps inadvertently included in the solution thus obtained are removed by treating the solution with an acid to liberate free fatty acids which are then saponified with alkali metal hydroxide to convert them into water soluble soaps. The solution is then washed with water to free it of the water soluble soaps. In this way, I obtain an almost pure extract of the vitamin. The resaponification with alkali metal hydroxide also serves to remove any free fatty acids originally present in the alcoholic extract.

The washed ethereal solution so obtained is then slowly distilled in the presence of carbon dioxide gas to avoid any oxidation and thus destruction of the vitamin, it being highly susceptible to oxidation, and a resinous material is obtained. This resinous material is what might be termed "raw" vitamin. It contains small amounts of cholesterol which can be removed by dissolving the raw vitamin in alcohol (85–90%) and cooling the alcoholic solution below 0° C. The cholesterol crystallizes out and is filtered off. The filtrate is then carefully evaporated and the residue dissolved in a very small quantity of methyl alcohol. Upon cooling the methyl alcohol solution, the vitamin A crystallizes and in small irregular crystals. The yield is about 0.1% of the raw cod liver oil.

It is to be noted that during the extraction processes and subsequent working up of the extract, access to air should be avoided in so far as possible and the drying of the product should be carried out in a vacuum or in an inert atmosphere.

The product finally obtained by the above examples is not only able to cure the eye-affection of white rats and recover their waste due to deficiency of vitamin A, but it acts on young rats to promote their growth and to keep them in a healthy condition; the quantities of it to be given to young rats are extremely small, 0.08 mgr. a day being sufficient. As the above product does not contain fats, glycerine, mineral matter, etc., it can be said to be vitamin A in a pure state, but the difficulty of removing traces of cholesterol from it and its property of easily absorbing oxygen do not as yet permit its chemical constitution to be determined.

The properties of the product are as follows: (1) It is soluble in such organic solvents as fats and oils, alcohol, ether, aceton, chloroform, carbon tetrachloride, etc., the colours of the solution ranging from yellow to orange. (2) Its chloroform solution turns deep indigo when treated with a few drops of concentrated sulphuric acid, green with nitric acid, and blue with hydrochloric acid and afterward changes to red. The intensity of the colour produced is observed to be nearly proportional to the effect of the vitamin. (3) Fuller's earth turns an indigo-blue color at once when it is added to the chloroform solution of the product and this reaction seems also to go parallel with the effect of the vitamin. (4) It has reducing power, i. e., it reduces Fehling's solution and an ammoniacal silver solution. It reduces also an aqueous solution of phospho-molybdenic acid changing it to a blue colour. (5) It is unstable in air and light. On standing in air, it increases in weight by absorbing oxygen, loses its effect gradually and fails to show the above reactions. (6) It is comparatively stable in some solutions, especially when it is dissolved in fatty matter.

As it is difficult to supply this substance in its isolated state, it is convenient for scientific and medical purposes to use it dissolved in fatty matter or alcohol in proper concentration. It is also convenient to adsorb the substance in lactose, starch, etc.

In the appended claims, by the term "fish oils" I mean to include all such oils herein enumerated and it is obvious that my process is equally adaptable to other fats or oils such as butter. Likewise, it will be obvious that other vitamin A solvents can be used, for instance a mixture of alcohol and ether, during the saponification of the fat.

Having thus described my invention, what I claim is:

1. The process of extracting vitamin A from fish oils containing the same which comprises treating the fish oil with an alcoholic solution of an alkali metal hydroxide to saponify the oil and convert the fatty acid constituents of the fish oil into alkali metal soaps, treating the alcoholic vitamin and soap mixture so obtained with an alcoholic solution of an alkaline earth metal chloride to precipitate insoluble alkaline earth metal soaps and filtering the insoluble soaps from the alcoholic solution of vitamin A.

2. The process of extracting vitamin A from fish oils containing the same which comprises treating the fish oil with an alcoholic solution of potassium hydroxide to saponify the oil and convert the fatty acid constituents of the fish oil into potassium soaps, treating the alcoholic vitamin and soap mixture so obtained with an alcoholic solution of an alkaline earth metal chloride to precipitate insoluble alkaline earth metal soaps and filtering the insoluble soaps from the alcoholic solution of vitamin A.

3. The process of extracting vitamin A from fish oils containing the same which comprises treating the fish oil with an alcoholic solution of potassium hydroxide to saponify the oil and convert the fatty acid constituents of the fish oil into potassium soaps, treating the alcoholic vitamin and soap mixture so obtained with an alcoholic solution of calcium chloride to precipitate insoluble calcium soaps and filtering the insoluble soaps from the alcoholic solution of vitamin A.

4. The process of extracting vitamin A from fish oils containing the same which comprises treating the fish oil with an alcoholic solution of an alkali metal hydroxide to saponify the oil and convert the fatty acid constituents of the fish oil into alkali metal soaps, treating the alcoholic vitamin and soap mixture so obtained with an alcoholic solution of an alkaline earth metal chloride to precipitate insoluble alkaline earth metal soaps, filtering the insoluble soaps from the alcoholic solution of vitamin A, treating the alcoholic solution with carbon dioxide gas to precipitate any alkaline earth metal chloride therein as carbonates, filtering off the precipitated carbonates, driving off the alcohol at low temperature and taking up the residue in an ethereal solvent.

5. The process of extracting vitamin A from fish oils containing the same which comprises treating the fish oil with an alcoholic solution of potassium hydroxide to saponify the oil and convert the fatty acid constituents of the fish oil into potassium soaps, treating the alcoholic vitamin and soap mixture so obtained with an alcoholic solution of an alkaline earth metal chloride to precipitate insoluble alkaline earth metal soaps, filtering the insoluble soaps from the alcoholic solution of vitamin A, treating the alcoholic solution with carbon dioxide gas to precipitate any alkaline earth metal chloride therein as carbonates, filtering off the precipitated carbonates, driving off the alcohol at low temperature and taking up the residue in an ethereal solvent.

6. The process of extracting vitamin A from fish oils containing the same which comprises treating the fish oil with an alcoholic solution of potassium hydroxide to saponify the oil and convert the fatty acid constituents of the fish oil into potassium soaps, treating the alcoholic vitamin and soap mixture so obtained with an alcoholic solution of calcium chloride to precipitate insoluble calcium soaps, filtering the insoluble soaps from the alcoholic solution of vitamin A, treating the alcoholic solution with carbon dioxide gas to precipitate any alkaline earth metal chloride therein as carbonates, filtering off the precipitated carbonates, driving off the alcohol at low temperature and taking up the residue in an ethereal solvent.

In testimony whereof he affixes his signature.

KATSUMI TAKAHASHI. [L. S.]